US009430859B2

(12) United States Patent
Kim et al.

(10) Patent No.: US 9,430,859 B2
(45) Date of Patent: Aug. 30, 2016

(54) IMAGE PROCESSING APPARATUS, IMAGE RELAYING APPARATUS, METHOD FOR PROCESSING IMAGE, AND METHOD FOR RELAYING IMAGE

(71) Applicant: SAMSUNG ELECTRONICS CO., LTD., Suwon-si (KR)

(72) Inventors: Yong-tae Kim, Suwon-si (KR); Jae-han Kim, Suwon-si (KR); Jae-sung Park, Gunpo-si (KR); Yun-sun Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 13/854,402

(22) Filed: Apr. 1, 2013

(65) Prior Publication Data

US 2014/0002695 A1    Jan. 2, 2014

(30) Foreign Application Priority Data

Jun. 27, 2012  (KR) .......................... 10-2012-0069195

(51) Int. Cl.
  *G06T 11/60* (2006.01)
  *H04N 1/00* (2006.01)
  *H04N 5/262* (2006.01)
  *H04N 1/32* (2006.01)

(52) U.S. Cl.
  CPC ............ *G06T 11/60* (2013.01); *H04N 1/00137* (2013.01); *H04N 1/00167* (2013.01); *H04N 5/2621* (2013.01); *H04N 5/2624* (2013.01); *H04N 1/32128* (2013.01); *H04N 2201/3205* (2013.01); *H04N 2201/3215* (2013.01)

(58) Field of Classification Search
  None
  See application file for complete search history.

(56) References Cited

U.S. PATENT DOCUMENTS

| | | | |
|---|---|---|---|
| 6,323,877 B1 | 11/2001 | Katoh et al. | |
| 9,215,405 B2 * | 12/2015 | Atkinson | H04N 7/141 |
| 2003/0099395 A1 | 5/2003 | Wang et al. | |
| 2006/0061599 A1 * | 3/2006 | Yu et al. | 345/649 |
| 2006/0120619 A1 | 6/2006 | Avidan et al. | |
| 2006/0239572 A1 * | 10/2006 | Yamane et al. | 382/236 |
| 2007/0146798 A1 * | 6/2007 | Eto et al. | 358/302 |
| 2008/0144094 A1 | 6/2008 | Itoh et al. | |
| 2008/0239131 A1 * | 10/2008 | Thorn | 348/333.01 |
| 2008/0309961 A1 * | 12/2008 | Aichi et al. | 358/1.15 |
| 2011/0249086 A1 * | 10/2011 | Guo et al. | 348/14.12 |
| 2013/0300821 A1 * | 11/2013 | Lankford et al. | 348/14.08 |

OTHER PUBLICATIONS

Written Opinion (PCT/ISA/237) dated Jun. 3, 2013 from the International Searching Authority in counterpart Application No. PCT/KR2013/001003.
International Search Report (PCT/ISA/210) dated Jun. 3, 2013 from the International Searching Authority in counterpart Application No. PCT/KR2013/001003.

* cited by examiner

*Primary Examiner* — Albert Cutler
(74) *Attorney, Agent, or Firm* — Sughrue Mion, PLLC

(57) ABSTRACT

A method of relaying an image. The method includes receiving a plurality of images which are photographed by a plurality of image processing apparatuses, determining orientation modes of the plurality of images, combining the plurality of images to generate a combined image in which the plurality of combined images are orientated in the same way, and transmitting the combined image to the plurality of image processing apparatuses.

19 Claims, 14 Drawing Sheets

IMAGE PROCESSING APPARATUS, IMAGE RELAYING APPARATUS, METHOD FOR PROCESSING IMAGE, AND METHOD FOR RELAYING IMAGE

CROSS-REFERENCE TO RELATED APPLICATION

This application claims priority from Korean Patent Application No. 10-2012-0069195, filed on Jun. 27, 2012 in the Korean Intellectual Property Office, the disclosure of which is incorporated herein by reference in its entirety.

BACKGROUND

1. Field

Methods and apparatuses consistent with exemplary embodiments relate to an image processing apparatus, an image relaying apparatus, a method for processing an image, and a method for relaying an image, and more particularly, to an image processing apparatus, an image relaying apparatus, a method for processing an image, and a method for relaying an image, which can provide an enhanced mixed image when exchanging images among a plurality of users.

2. Description of the Related Art

With the development of electronic technologies, various kinds of electronic products have been developed and distributed to the users. In particular, as multimedia communication services have become popular in recent years, the multimedia industry is growing based on real-time applications, which allow users at different locations to have a conversation with one another face to face. Since a plurality of users use such a real-time application, the application exchanges information with users' respective terminals through a network, which connects several locations to one another.

A method for executing the real-time application may be largely divided into a merge method and a relay method according to a transmission route of packets. In the merge method, the plurality of terminals are indirectly connected to one another through a multi-point control unit (MCU) over a network. The MCU refers to a dedicated device that allows an apparatus for executing a real-time application to access the plurality of terminals. That is, the MCU combines user images of the plurality of terminals into a single image, and transmits the image to the plurality of terminals.

In the related-art, since the real-time application is executed through a TV or a display of a fixed size and orientation, a big problem does not arise in the MCU in combining images, even if an orientation of a user image is not considered in combining various images. However, with the development of mobile apparatuses such as mobile phones, laptops, or personal digital assistants (PDAs), the user images may be provided with various orientations.

Therefore, there is a problem that a combined image which is easily recognizable by users may not be provided.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image processing apparatus, an image relaying apparatus, a method for processing an image, and a method for relaying an image, which process images to have the same orientation mode in the image processing apparatus or the image relaying apparatus, thereby providing an appropriate combined image.

According to an aspect of an exemplary embodiment, there is provided a method of relaying an image of an image relaying apparatus including: receiving a plurality of images captured by the plurality of image processing apparatuses, determining orientation modes of each of the plurality of images, combining the plurality of images to generate a combined image, and transmitting the combined image to the plurality of image processing apparatuses.

The transmitting may include transmitting information about the combined image to the plurality of image processing apparatuses along with the combined image.

The information about the combined image may include at least one of the determined orientation mode of each of the plurality of images, frame coordinates, rotation information, scale information, an aspect ratio, and a number of user images that are being combined.

The combining may include combining the plurality of images to have the same orientation mode based on the determined orientation modes.

The receiving may include receiving, from the plurality of image processing apparatuses, information about the images that were photographed by the plurality of image processing apparatus along with the images, and the determining may include determining the orientation modes of the plurality of images using the information about the images received from the plurality of image processing apparatuses.

The determining may include, if the plurality of images received are user images, determining the orientation modes of the plurality of user images using a face recognition algorithm.

According to an aspect of another exemplary embodiment, there is provided a method of processing an image including: capturing an image by an image processing apparatus, performing image-processing to change an orientation mode of the image to be consistent with an orientation mode of an image of at least one other image processing apparatus, transmitting the image-processed image to an image relaying apparatus, receiving a combined image in which the image-processed image and the at least one other image are combined using the image relaying apparatus, and displaying the mix image.

According to an aspect of still another exemplary embodiment, there is provided a method of processing an image including: capturing an image by an image processing apparatus, transmitting the captured image to an image relaying apparatus, receiving a combined image in which the captured image and at least one other image of at least one other image processing apparatus are combined using the image relaying apparatus, image-processing the combined image so that the captured image and the at least one other image in the combined image have a pre-set orientation mode, and displaying the image-processed combined image.

The receiving may include receiving information about the combined image along with the combined image, and the image-processing may include image-processing the combined image using the information about the combined image so that the captured image and the at least one other image in the combined image have the pre-set orientation mode.

The image-processing may include, if the captured image and the at least one other image are user images, image-processing the combined image using a face recognition algorithm so that the captured image and the at least one other image in the combined image have the same pre-set orientation mode.

According to an aspect of still another exemplary embodiment, there is provided a method of processing an image including: capturing an image by an image processing apparatus, transmitting the captured image to an image relaying apparatus, receiving a combined image in which the captured image and at least one other image of at least one other image processing apparatus are combined using the image relaying apparatus, extracting the captured image and the at least one other image from the combined image, and rendering the extracted images into an image having a pre-set layout, and displaying the rendered image.

According to an aspect of still another exemplary embodiment, there is provided an image relaying apparatus including: a communication interface which receives a plurality of images from the plurality of image processing apparatuses, a determiner which determines orientation modes of the plurality of images, an image processor which combines the plurality of images to generate a combined image, and a controller which controls the communication interface to transmit the combined image to the plurality of image processing apparatuses.

The communication interface may transmit information about the combined image to the plurality of image processing apparatuses along with the combined image.

The information about the combined image may include at least one of the determined orientation mode of each of the plurality of images, frame coordinates, rotation information, scale information, an aspect ratio, and a number of images that are being combined.

The image processing unit may combine the plurality of images to have the same orientation mode based on the determined orientation modes.

The communication interface may receive information about the plurality of images from the plurality of image processing apparatuses along with the plurality of images, and the determiner may determine the orientation modes of the plurality of images using the information about the plurality of images received from the plurality of image processing apparatuses.

If the plurality of images are user images, the determiner may determine the orientation modes of each of the plurality of user images using a face recognition algorithm.

According to yet another aspect of another exemplary embodiment, there is provided an image processing apparatus including: a photographing unit which photographs an image, an image processor which performs image-processing to change an orientation mode of the photographed image to be consistent with an orientation mode of an image of at least one other image processing apparatus, a communication interface which transmits the image-processed image to an image relaying apparatus, and receives a combined image in which the image-processed image and at least one other image are combined using the image relaying apparatus; and a user interface which displays the combined image.

The photographing unit may include a rotatable photographing element, and the image processor may control the photographing unit to photograph an image according to the orientation mode of the image of the at least one other image processing apparatus.

According to yet another aspect of another exemplary embodiment, there is provided an image processing apparatus including: a photographing unit which photographs an image, a communication interface which transmits the photographed image and receives a combined image in which the photographed image and at least one other image photographed by at least one other image processing apparatus are combined, an image processor which image-processes the combined image so that the photographed image and the at least one other image in the combined image have a pre-set orientation mode, and a user interface which displays the image-processed combined image.

The communication interface may receive information about the combined image along with the combined image, and the image processor may image-process the combined image using the information about the combined image so that the photographed image and the at least one other image in the combined image have the pre-set orientation mode.

If the photographed image and the at least one other image are user images, the image processor may image-process the combined image using a face recognition algorithm so that the photographed image and the at least one other image in the combined image have the pre-set orientation mode.

According to yet another aspect of another exemplary embodiment, there is provided an image processing apparatus including: a photographing unit which photographs an image, a communication interface which transmits the photographed image, and receives a combined image in which the photographed image and at least one other image of at least one other image processing apparatus are combined, and an image processor which extracts the photographed image and the at least one other image from the combined image, and renders the extracted images into an image having a pre-set layout, and a user interface which displays the rendered image.

According to yet another aspect of another exemplary embodiment, there is provided a non-transitory computer readable recording medium which includes a program for executing by a computer a method of relaying an image of an image relaying apparatus, the method including: receiving a plurality of images which are captured by the plurality of image processing apparatuses, determining orientation modes of each of the plurality of images, combining the plurality of images to generate a combined image, and transmitting the combined image to the plurality of image processing apparatuses.

According to an aspect of another exemplary embodiment, there is provided a non-transitory computer readable recording medium which includes a program for executing by a computer a method of processing an image of an image processing apparatus, the method including: capturing an image, performing image-processing to change an orientation mode of the photographed image to be consistent with an orientation mode of an image of at least one other image processing apparatus, transmitting the image-processed image to an image relaying apparatus, receiving a combined image in which the image-processed image and at least one other image are combined using the image relaying apparatus, and displaying the combined image.

According to an aspect of yet another exemplary embodiment, there is provided a non-transitory computer readable recording medium which includes a program for executing by a computer a method of processing an image of an image processing apparatus, the method including: capturing an image, transmitting the captured image to an image relaying apparatus, receiving a combined image in which the captured image and at least one other image of at least one other image processing apparatus are combined using the image relaying apparatus, image-processing the combined image so that the captured image and the at least one other image in the combined image have a pre-set orientation mode, and displaying the image-processed combined image.

According to an aspect of yet another exemplary embodiment, there is provided a non-transitory computer readable recording medium which includes a program for executing by a computer a method of processing an image of an image processing apparatus, the method including: capturing an image, transmitting the captured image to an image relaying apparatus, receiving a combined image in which the captured image and at least one other image of at least one other image processing apparatus are combined using the image relaying apparatus, extracting the captured image and the at least one other image from the combined image, and rendering the extracted images into an image having a pre-set layout, and displaying the rendered image.

BRIEF DESCRIPTION OF THE DRAWING FIGURES

The above and/or other aspects will be more apparent by describing in detail exemplary embodiments, with reference to the accompanying drawings, in which.

Figure 16:
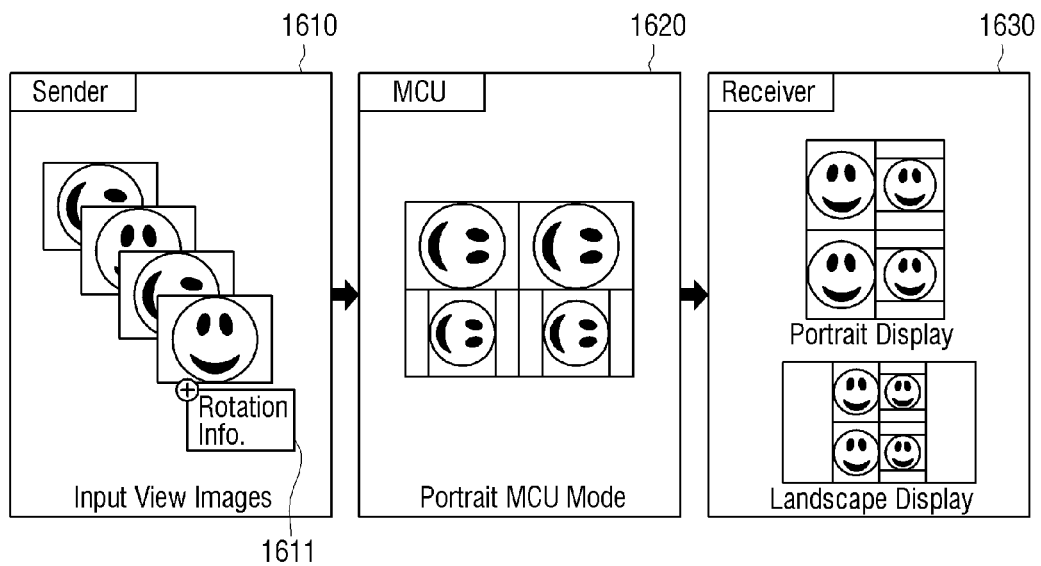
Figure 17A:
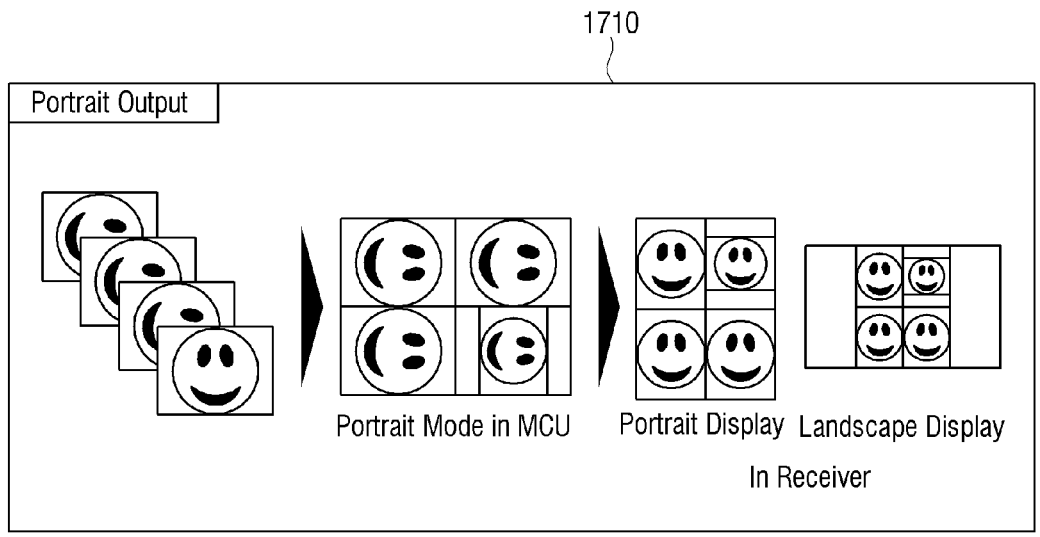
Figure 18:
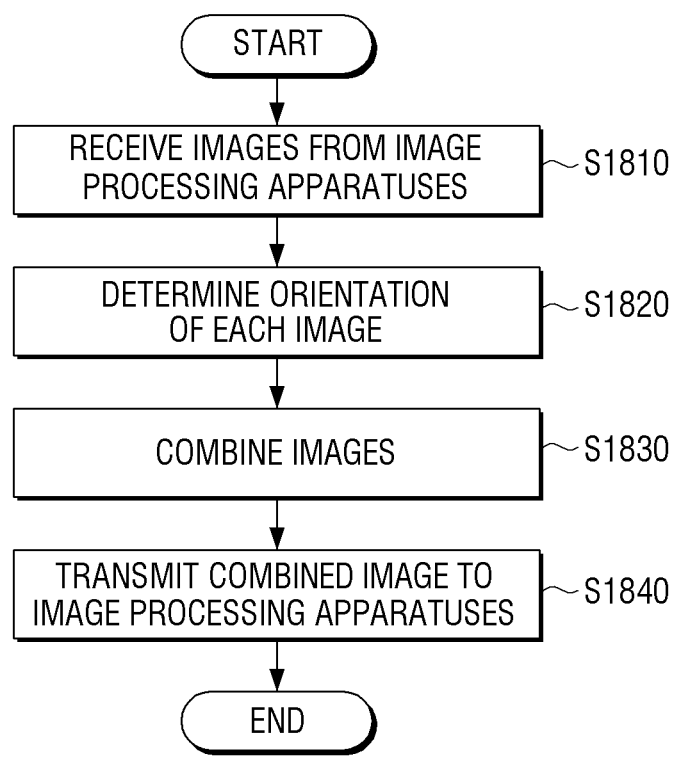
Figure 19:
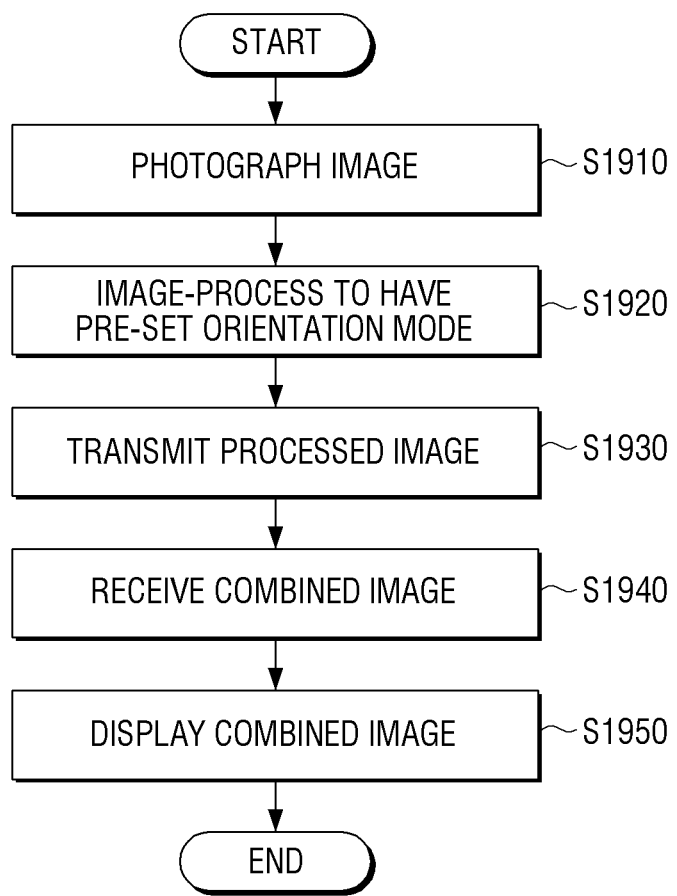
Figure 20:
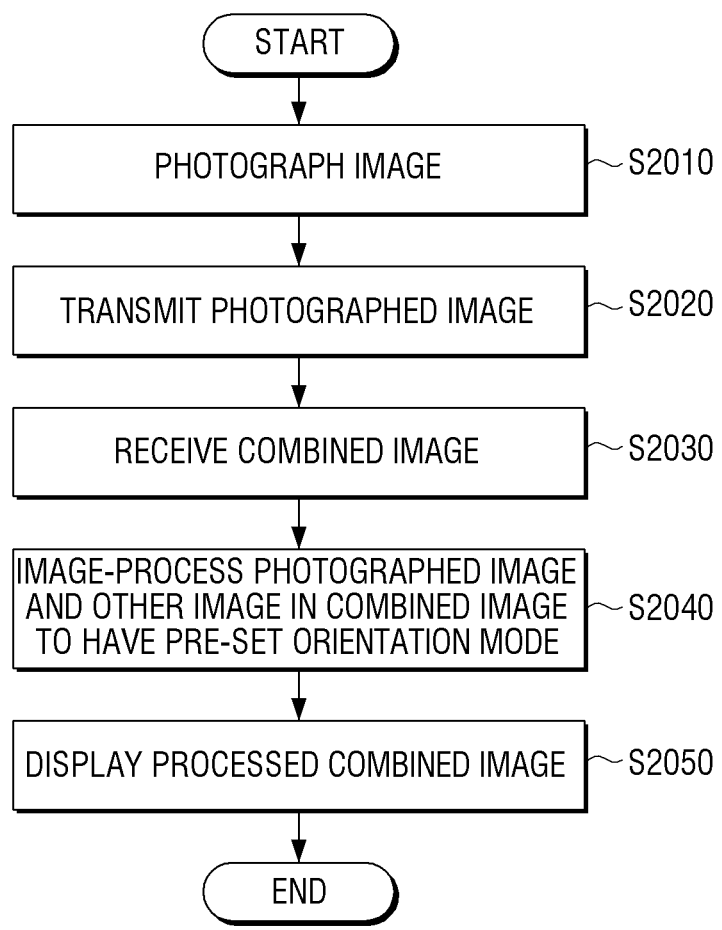
Figure 21:
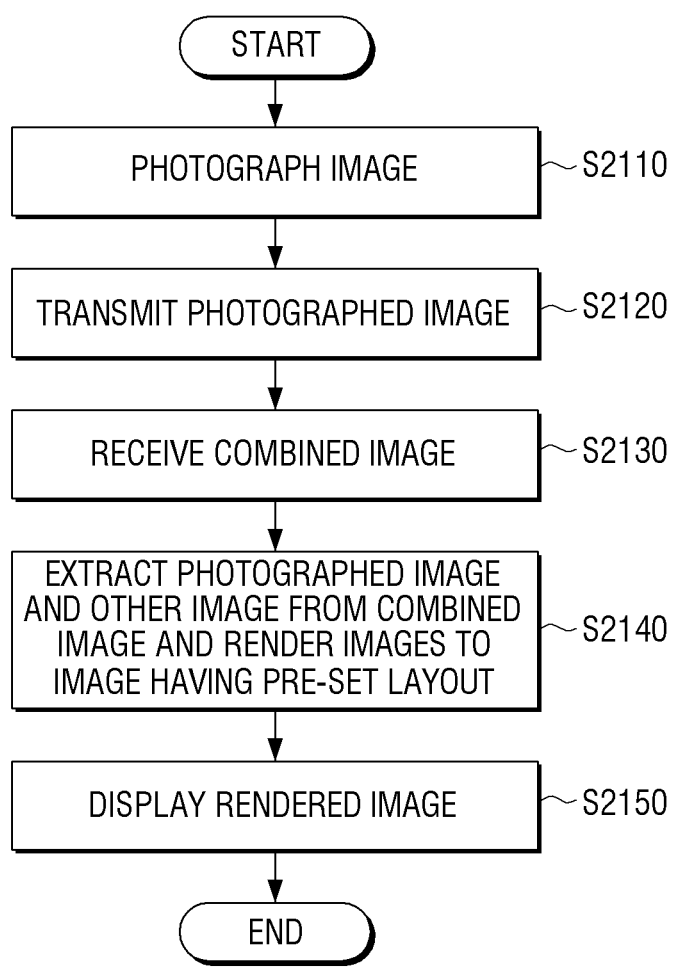

FIGS. 16 and 17A and B are views illustrating a method of processing an image and a method of relaying an image according to an exemplary embodiment;

FIG. 18 is a flowchart illustrating an image relaying operation of an image relaying apparatus according to an exemplary embodiment;

FIG. 19 is a flowchart illustrating an image processing operation of an image processing apparatus according to an exemplary embodiment;

FIG. 20 is a flowchart illustrating an image processing operation of an image processing apparatus according to an exemplary embodiment; and FIG. 21 is a flowchart illustrating an image processing operation of an image processing apparatus according to an exemplary embodiment.

DETAILED DESCRIPTION OF EXEMPLARY EMBODIMENTS

Hereinafter, exemplary embodiments will be described in greater detail with reference to the accompanying drawings. In the following description, same reference numerals are used for analogous elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
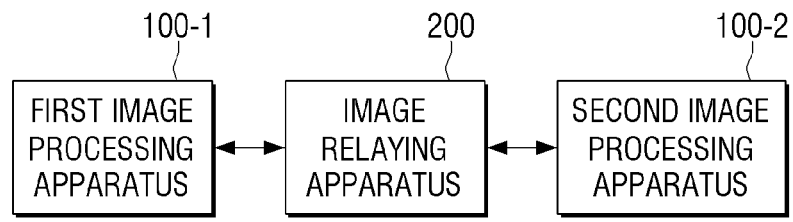
FIG. 1 is a block diagram illustrating an image processing system according to an exemplary embodiment.

FIG. 1 is a block diagram illustrating an image processing system according to various exemplary embodiments.

Referring to FIG. 1, an image processing system includes a plurality of image processing apparatuses 100-1 and 100-2 and an image relaying apparatus 200.

The image processing apparatuses 100-1 and 100-2 photograph user images and transmit the user images to the image relaying apparatus 200. The image relaying apparatus 200 generates a combined image in which a plurality of images transmitted from the image processing apparatuses 100-1 and 100-2 are combined, and transmits the combined image back to the image processing apparatuses 100-1 and 100-2. The image processing apparatuses 100-1 and 100-2 display the combined image.

The combined image displayed on each of the image processing apparatuses 100-1 and 100-2 refers to an image in which the images photographed by the image processing apparatuses 100-1 and 100-2 are adjusted to be in a same orientation mode and are aligned. The operation of adjusting the image may be performed in various methods according to exemplary embodiments.

The orientation mode recited herein is determined according to an orientation state of a display panel and may include a landscape mode and a portrait mode.

According to an exemplary embodiment, each of the image processing apparatuses 100-1 and 100-2 may image-process a photographed image to have a pre-set orientation mode.

Specifically, the image relaying apparatus 200 may provide information about a pre-set orientation mode to each of the image processing apparatuses 100-1 and 100-2. Each of the image processing apparatus 100-1 and 100-2 image-processes the photographed image to have the pre-set orientation mode, and transmits the image-processed image to the image relaying apparatus 200. After that, the image relaying apparatus 200 generates a combined image by combining the plurality of images, and transmits the combined image back to each of the image processing apparatuses 100-1 and 100-2. Each of the image processing apparatuses 100-1 and 100-2 may display the combined image.

In this case, it is assumed that the image relaying apparatus 200 receives the user images in only one pre-set mode, and thus the image relaying apparatus 200 only performs combining of the images without having to perform other processing such as rotation or scaling. Also, the image processing apparatuses 100-1 and 100-2 serving as a receiver may display the combined image as is. Therefore, the image processing apparatuses 100-1 and 1001 after serving as a sender may have a simple configuration.

According to another exemplary embodiment, each of the image processing apparatuses 100-1 and 100-2 may receive the combined image from the image relaying apparatus 200, and may image-process the combined image so that the image photographed by each of the image processing apparatuses 100-1 and 100-2 and at least one other image have the same orientation mode.

Specifically, the image processing apparatuses 100-1 and 100-2 transmit the photographed images to the image relaying apparatus 200. The image relaying apparatus 200 generates a combined image by combining the plurality of images received, and transmits the combined image to the image processing apparatuses 100-1 and 100-2. After that, each of the image processing apparatuses 100-1 and 100-2 image-processes the combined image so that the image photographed by each of the image processing apparatuses 100-1 and 100-2 and at least one other image have the same orientation mode, and displays the combined image.

In this case, the image relaying apparatus 200 may have a simple configuration and each user image can be reproduced without losing resolution.

According to another exemplary embodiment, the image relaying apparatus 200 may adjust the plurality of images to have the same orientation mode and then may combine the images.

Specifically, the image processing apparatuses 100-1 and 100-2 may transmit the photographed images to the image relaying apparatus 200. The image relaying apparatus 200 may image-process the plurality of image to have the same orientation mode and generate a combined image, and may transmit the combined image to the image processing apparatuses 100-1 and 100-2. After that, each of the image processing apparatuses 100-1 and 100-2 may display the combined image.

In this case, the image processing apparatuses 100-1 and 100-2 are not required to image-process the images to have a pre-set orientation mode, and thus the configuration of each of the image processing apparatuses 100-1 and 100-2 is simpler.

The image processing apparatuses 100-1 and 100-2 may be mobile apparatuses having a photographing element, such as mobile phones, smart phones, laptops, electronic pads, or PDAs, or may be televisions, smart TVs, or video conferencing systems having a photographing element.

The image relaying apparatus 200 may perform a function of a multi-point control unit (MCU) in a video conferencing system. The image relaying apparatus 200 may be embedded in the image processing apparatuses 100-1 and 100-2 or may be a separate and independent apparatus.

As described above, in the image processing system according to the various exemplary embodiments, the image processing apparatuses 100-1 and 100-2 or the image relaying apparatus 200 image-processes the images to have the same orientation mode and provides an appropriate combined image.

Figure 2:
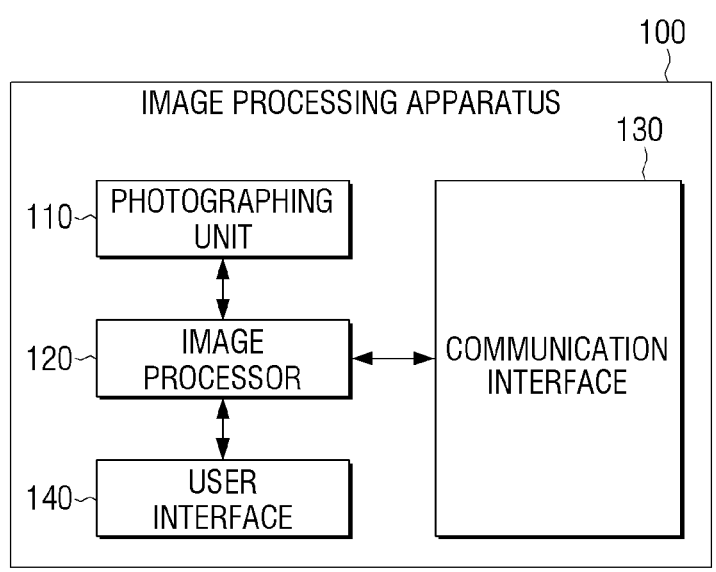
FIG. 2 is a block diagram illustrating an image processing apparatus according to an exemplary embodiment.

FIG. 2 is a block diagram illustrating an image processing apparatus according to an exemplary embodiment.

Referring to FIG. 2, the image processing apparatus 100 includes a photographing unit 110, an image processor 120, a communication interface 130, and a user interface 140.

The photographing unit 110 photographs an image.

Specifically, the photographing unit 110 includes a rotatable photographing element. Also, the photographing unit 110 may include a plurality of photographing elements and may perform zoom-in and zoom-out functions. An image photographed by the photographing unit 110 may be transmitted to the image processor 120 or the communication interface 130.

The photographed image may be a user image, a conference material, or a lecture material. The photographed image may be stored in the image processing apparatus in its memory (not shown).

The image processor 120 performs image-processing to change an orientation mode of the photographed image to be consistent with an orientation mode of an image of at least one other image processing apparatus 100.

Specifically, at an operation of transmitting the photographed image, each image processing apparatus 100 may image-process the photographed image according to one pre-set mode regardless of an orientation state of a display panel of the image processing apparatus. The image-processing may be a combination of rotation, scaling and/or cropping.

For instance, if the image processing apparatus 100 is set in a landscape mode and an image is photographed in the landscape mode, the image processing apparatus 100 transmits the user image to the image relaying apparatus 200 without performing the image-processing. However, if an image is photographed in a portrait mode, the image processing apparatus 100 performs image-processing such as rotation or scaling according to the landscape and transmits the image-processed image to the image relaying apparatus 200.

The image relaying apparatus 200 may provide information about the pre-set orientation mode to each image processing apparatus 100 so that the orientation mode is consistent with the orientation mode of the image of at least one other image processing apparatus 100.

Also, the image processor 120 may control the photographing unit 110 to photograph an image according to the orientation mode of the image of at least one other image processing apparatus.

According to another exemplary embodiment, the image processor 120 may image-process a received combined image so that a photographed image and at least one other image in the combined image have a pre-set orientation mode.

Specifically, the image processor 120 may receive a combined image from the image relaying apparatus 200, and may image-process the combined image so that a photographed image and at least one other image in the combined image have a pre-set orientation mode according to an orientation state of a display panel of the image processing apparatus 100. The image-processing may be a combination of rotation, scaling, and/or cropping.

In this case, the communication interface 130 may receive information about the combined image along with the combined image, and may image-process the image to have the pre-set orientation mode using the information about the combined image. The information about the combined image may include at least one of an orientation mode of each of a plurality of images combined in the combined image, frame coordinates, rotation information, scale information, an aspect ratio, and a number of images combined.

The image processor 120 may include a plurality of renderers. In this case, the image processing apparatus 100 extracts the photographed image and at least one other image from the received combined image, and renders the images into an image having a pre-set layout.

The pre-set layout (or frame) may be a layout (or a frame) which is arbitrary set by the user or may be set according to a configuration of the display screen of the image processing apparatus 100. An exemplary embodiment of which will be explained in detail below with reference to FIGS. 14 and 15.

If the photographed image and at least one other image are user images, the image processor 120 may image-process the photographed image and at least one other image in the received combined image to have the pre-set orientation mode using a face recognition algorithm. Specifically, the face recognition algorithm is an algorithm that can find a position characteristic of a face by analyzing a symmetric structure of the face in an entire image, a facial feature, and eyes' positions. The face recognition algorithm may include a geometrical method, principal component analysis (PCA), fisher linear discriminant (FLD), a support vector machine (SVM), and a nerve network circuit. The image processing apparatus 100 may recognize a degree of rotation of a user image using the face recognition algorithm, and may image-process the image to have the pre-set orientation mode according to the degree of rotation.

According to another exemplary embodiment, if the image relaying apparatus 200 adjusts a plurality of images to have the same orientation mode and combines the images, the image processor 120 may omit the operation of processing a photographed image and a combined image to have a pre-set orientation mode. In this case, the image-processing may be a combination of general encoding, decoding, scaling, de-interlacing, noise removal, and/or definition improvement.

The communication interface 130 may transmit the image-processed image to the image relaying apparatus 200, and may receive a combined image in which the image-processed image and at least one other image are combined through the image relaying apparatus 200.

Specifically, if an image photographed by the image processing apparatus 100 is image-processed to have a pre-set orientation mode, the communication interface 130 may transmit the image-processed image to the image relaying apparatus 200, and may receive a combined image in which the image-processed image and at least one other image are combined through the image relaying apparatus 200.

According to another exemplary embodiment, the communication interface 130 may transmit a photographed image, and may receive a combined image in which the photographed image and at least one other image photographed by at least one other image processing apparatus 100 are combined.

Specifically, if the image processing apparatus 100 image-processes the photographed image and at least one other image in the combined image to have the same orientation mode, the communication interface 130 transmits the photographed image to the image relaying apparatus 200. After that, the image processing apparatus 100 may receive the combined image in which the photographed image and at least one other image photographed by at least one other image processing apparatus 100 are combined through the image relaying apparatus 200.

In this case, the communication interface 130 may receive information about the combined image along with the combined image. The information about the combined image may include at least one of an orientation mode of each of a plurality of images combined in the combined image, frame coordinates, rotation information, scale information, an aspect ratio, and a number of images combined.

According to another exemplary embodiment, if the image relaying apparatus 200 adjusts a plurality of images to have the same orientation mode, the communication interface 130 may transmit information about the photographed image to the image relaying apparatus 200 along with the photographed image. The information about the photographed image may include at least one of an orientation, resolution, an aspect ratio, and a size of a user image.

The communication interface 130 may communicate with various kinds of external apparatuses according to various communication methods. The communication interface 130 may include various communication modules such as a broadcast receiving module (not shown), a local area wireless communication module (not shown), a wireless communication module (not shown), and a GPS module (not shown). The communication interface 130 may be connected to the image relaying apparatus 200 in a wireless or wired manner.

The user interface 140 displays the received combined image.

According to another exemplary embodiment, if the image processing apparatus 100 image-processes the combined image so that the photographed image and at least one other image in the combined image have the same orientation mode, the user interface 140 displays the image-processed image. Also, the user interface 140 may extract the photographed image and at least one other image from the received combined image, and may render the images into an image having a pre-set layout and display the rendered image.

The user interface 140 may include a display panel to display an image and at least one button. In this case, the display panel may be realized by a touch screen. The user interface 140 provides various UI screens. The user may input a selecting command by touching the UI screen directly or by manipulating the button provided on the user interface 140. The selecting command may be a command to set various functions of the image processing apparatus 100 or set mode change, pause, and replay. The display panel of the user interface 140 may also displays images.

Figure 3:
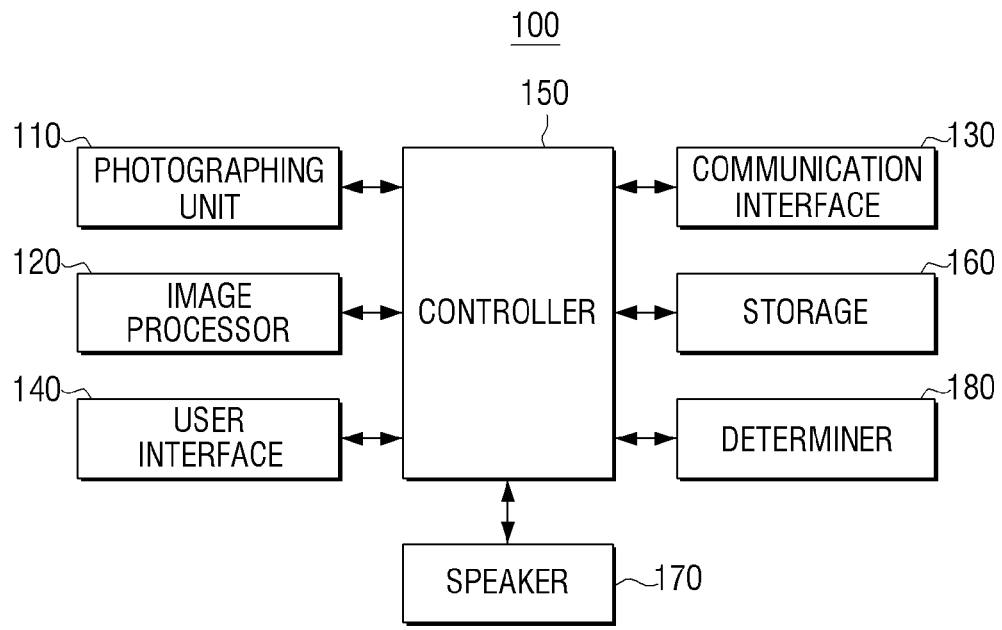
FIG. 3 is a block diagram illustrating an image processing apparatus according to various exemplary embodiments.

FIG. 3 is a block diagram illustrating the image processing apparatus 100 according to various exemplary embodiments.

Referring to FIG. 3, the image processing apparatus 100 includes a photographing unit 110, an image processor 120, a communication interface 130, a user interface 140, a controller 150, a storage 160, a determiner 180, and a speaker 170.

The operations of the photographing unit 110, the image processor 120, the communication interface 130, and the user interface 140 have been described above with reference to FIG. 2, and thus an overlapped explanation is omitted.

The controller 150 controls the elements included in the image processing apparatus 100. For example, the controller 150 may selectively control image-processing of the image processing apparatus 100 and may communicate with an external apparatus using the communication interface 130.

The storage 160 may store various programs or data regarding the operation of the image processing apparatus 100, setting information set by the user, system operating software, various applications, and information about operations corresponding to user manipulations.

The speaker 170 outputs a sound reproduced in the image processing apparatus 100, or may receive a sound from another image processing apparatus 100 or the image relaying apparatus 200 through the communication interface 130, and may output the sound.

The determiner 180 determines an orientation of a user image. Specifically, the determiner 180 may determine an orientation of a user image in order for the image processor 120 to process the image to have a pre-set orientation mode.

The determiner 180 may include gyroscope sensor. The determiner 180 may read a change in an angle caused by vertical, horizontal, forward and backward movements of the image processing apparatus 100 using the gyroscope sensor, and may detect an orientation of the image processing apparatus 100. Accordingly, the image processing apparatus 100 may determines an orientation of a photographed image. In this case, the image processing apparatus 100 may transmit the photographed image and information about the photographed image including information about the orientation of the image determined by the determiner 180 to the image relaying apparatus 200 through the communication interface 130.

The determiner 180 may determine an orientation of each image in the combined image using the information about the combined image received from the image relaying apparatus 200. Also, the determiner 180 may determine an orientation of a user image using a face recognition algorithm.

As described above, the image processing apparatus 100 according to various exemplary embodiments provide an appropriate combined mage by image-processing images to have the same orientation mode in the image processing apparatus 100 or the image relaying apparatus 200.

Figure 4:
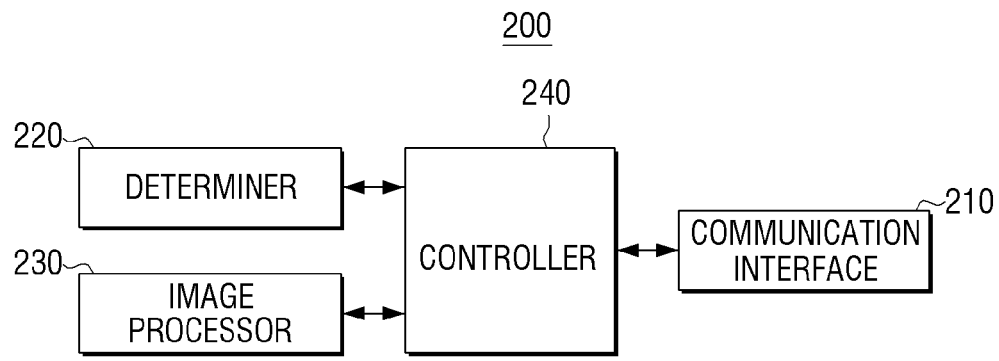
FIG. 4 is a block diagram illustrating an image relaying apparatus according to an exemplary embodiment.

FIG. 4 is a block diagram illustrating an image relaying apparatus according to an exemplary embodiment.

Referring to FIG. 4, the image relaying apparatus 200 includes a communication interface 210, a determiner 220, an image processor 230, and a controller 240. It may also include a memory (not shown).

The communication interface 210 receives user images from a plurality of image processing apparatuses 100. Also, the communication interface 210 transmits a combined image to the plurality of image processing apparatuses 100 according to control of the controller 240.

In this case, the communication interface 210 may receive information about the photographed user image from each of the image processing apparatuses 100 along with the user image.

Also, the communication interface 210 may transmit information about the combined image to each of the plurality of image processing apparatuses 200 along with the combined image. The information about the combined image may include at least one of a determined user orientation of each of the plurality of user images, frame coordinates, rotation information, scale information, an aspect ratio, and a number of combined user images.

The communication interface 210 may communicate with various kinds of external apparatuses according to various communication methods. The communication interface 210 may include various communication modules such as a broadcast receiving module (not shown), a local area wireless communication module (not shown), a wireless communication module (not shown), and a GPS module (not shown).

The determiner 220 determines an orientation mode of each of the plurality of images.

Specifically, the determiner 220 may determine a user orientation mode of each of the plurality of images received from the plurality of image processing apparatuses 100.

In this case, the determiner 220 receives information about the photographed image from each of the image processing apparatuses 100 along with the photographed image, and determines the orientation mode of each of the plurality of images using the received information about the photographed image.

If the plurality of images received are user images, the determiner 220 may determine an orientation mode of each of the plurality of user images using a separate face recognition algorithm.

The image processor 230 combines the plurality of received images. Specifically, the image processor 230 may generate a single combined image by combining the plurality of user images received from the plurality of image processing apparatuses 100.

According to another exemplary embodiment, the image relaying apparatus 200 may combine the plurality of images to have the same orientation mode. In this case, the image processor 230 may perform image-processing such as rotation and scaling based on the orientation mode of each of the plurality of images determined by the determiner 220 so that the plurality of images have the same orientation mode, and combines the plurality of images.

The controller 240 controls the communication interface 210 to transmit the combined image to each of the plurality of image processing apparatuses 100. Specifically, the image relaying apparatus 200 controls to transmit the combined image in which the plurality of images are combined to each of the plurality of image processing apparatuses 100.

The controller 240 may control the elements included in the image relaying apparatus 200.

Figure 5:
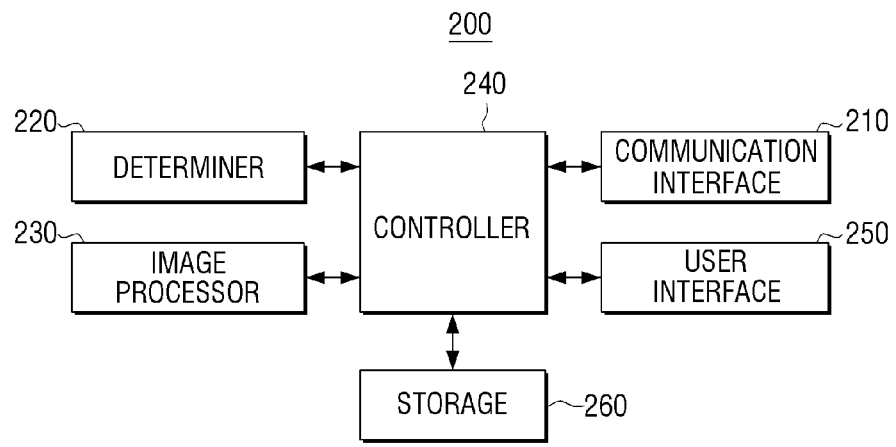
FIG. 5 is a block diagram illustrating an image relaying apparatus according to various exemplary embodiments.

FIG. 5 is a block diagram illustrating an image relaying apparatus according to various exemplary embodiments.

Referring to FIG. 5, the image relaying apparatus 200 includes a communication interface 210, a determiner 220, an image processor 230, a controller 240, a user interface 250, and a storage 260.

Exemplary operations of the communication interface 210, the determiner 220, the image processor 230, and the controller 240 have been described above in detail with reference to FIG. 4, and a redundant explanation of which are omitted.

The user interface 250 may include a display panel to display an image and at least one button. In this case, the display panel may be realized by a touch screen. The user interface 250 provides various UI screens, and the user may input a selecting command by touching the UI screen directly or by manipulating the button provided on the user interface 250. The selecting command may be a command to set various functions of the image relaying apparatus 200 or set mode change, pause, and replay. The user interface also displays images The storage 260 may store various programs or data regarding the operation of the image relaying apparatus 200, setting information set by the user, system operating software, various applications, and information about operations corresponding to user manipulations.

As described above, according to various exemplary embodiments, the image relaying apparatus 200 provides an appropriate combined image by image-processing the images to have the same orientation mode in the image processing apparatus 100 or the image relaying apparatus 200.

FIGS. 6 to 9 are views illustrating a method of processing an image and a method of relaying an image according to an exemplary embodiment.

Specifically, an operation of processing an image to have a pre-set orientation mode in a sender (Rotation in Sender) according to an exemplary embodiment will be explained with reference to FIGS. 6 to 9.

Figure 6:
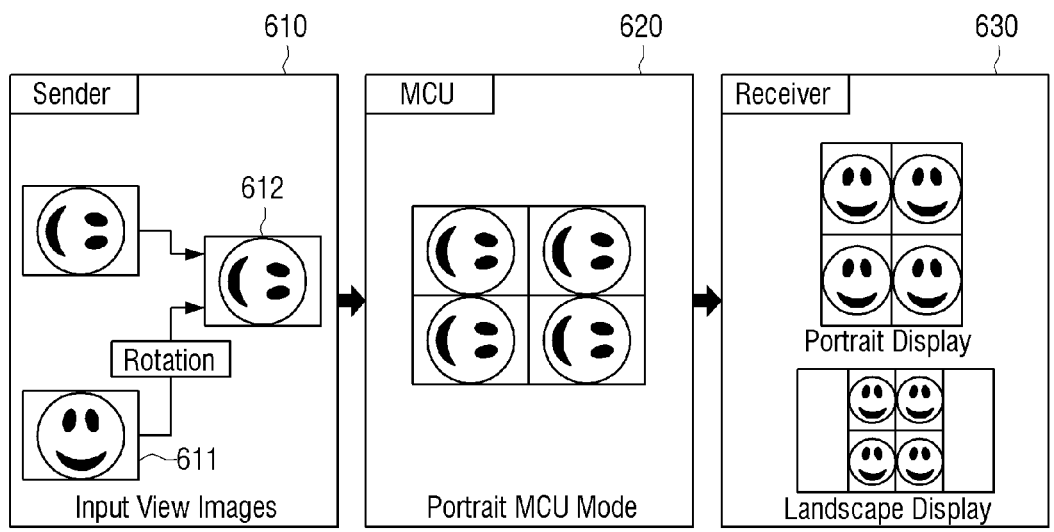
FIGS. 6 to 9 are views illustrating a method of processing an image and a method of relaying an image according to an exemplary embodiment.

Referring to FIG. 6, an image processing apparatus 100 of a sender 610 is pre-set to transmit an image in a portrait mode. In this case, an image 611 which is photographed in a landscape mode may be processed to have the portrait mode by being rotated 612, and may be transmitted to a MCU 620, which is an image relaying apparatus 200. The MCU 620 of the image relaying apparatus 200 combines user images transmitted from the sender 610, and transmits a combined image to an image processing apparatus 100 of a receiver 630. The image processing apparatus 100 of the receiver 630 may display the combined image. The image processing apparatus 100 of the sender 610 and the MCU 620 illustrate images stored in a memory, whereas the image processing apparatus 100 of the receiver 630 illustrates user images displayed on a display. That is, the combined image which is received by the image processing apparatus 100 of the receiver 630 and stored in a memory is the same as the combined image illustrated in the MCU 620.

For reference, if an image is photographed in the landscape mode, an image which is input to an encoder and stored may be the same as the photographed image.

On the other hand, if an image is photographed in the portrait mode, the photographed image is rotated by 90° and the rotated image is input to the encoder and stored.

Figure 7:
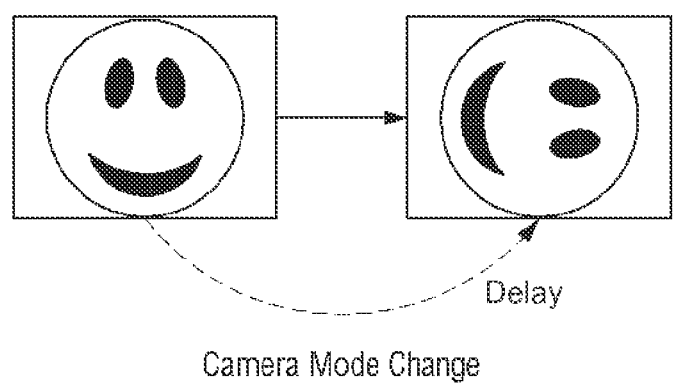

With reference to FIG. 7, an exemplary embodiment of image-processing if the sender image-processes an image according to a pre-set orientation mode is described. Specifically, as a method of image-processing a user image to have a pre-set orientation mode in the image processing apparatus 100 of the sender, there is a method of controlling a rotatable photographing element of the photographing unit 110 to photograph an image in the pre-set orientation mode.

In this case, delay may occur every time the photographing element is rotated, but the advantage of this method is that other image processing such as rotation and scaling is not required.

Figure 8:
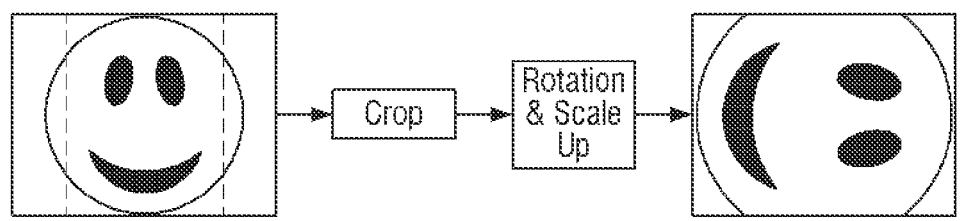
Figure 9:
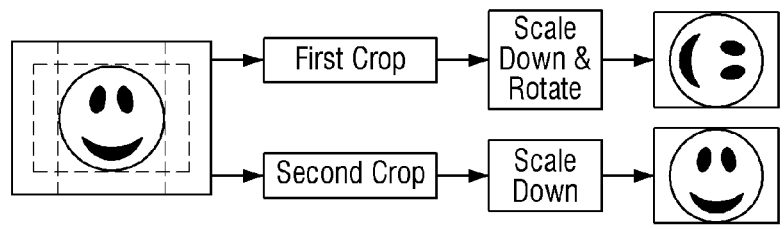

With reference to FIGS. 8 and 9, various exemplary embodiments of image-processing if the image processing apparatus 100 of the sender image-processes an image to have a pre-set orientation mode will be described.

In FIG. 8, a user image is photographed and an image of the same resolution is obtained. Then, the image is image-processed to have a pre-set orientation mode by cropping the image, rotating the image by 90°, and scaling up the image.

In FIG. 9, a user image is photographed and an image of high resolution is obtained according to an exemplary embodiment. The image is cropped according to a pre-set orientation mode. Then, if an orientation of the photographed user image is the same as the pre-set orientation mode, the image is scaled-down, and if not, the image is image-processed by scaling down and rotating the image.

In the exemplary image processing method described with reference to FIG. 8, the image-processing is not required if the orientation of the photographed user image is the same as the pre-set orientation mode.

On the other hand, in the exemplary image processing method described with reference to FIG. 9, scaling-up is not required.

Figure 10:
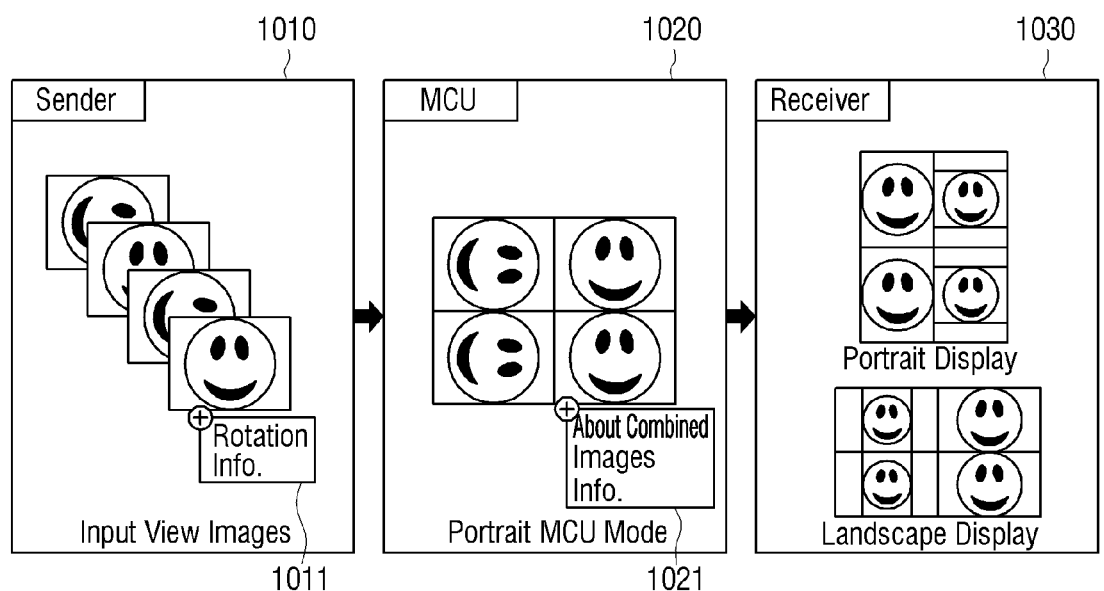
FIG. 10 is a view illustrating a method of processing an image and a method of relaying an image according to an exemplary embodiment.

FIG. 10 is a view illustrating a method of processing an image and a method of relaying an image according to an exemplary embodiment.

Specifically, FIG. 10 illustrates an operation of image-processing an image to have a pre-set orientation mode in a receiver (Rotation in Receiver).

Referring to FIG. 10, a plurality of image processing apparatuses 100 of a sender 1010 transmits information about photographed images 1011 to a MCU 1020, which is an image relaying apparatus 200, along with the photographed images. The MCU 1020 generates a combined image by combining the plurality of received user images, and generates information about the combined image 1021 based on the plurality of pieces of information about the photographed images 1011.

The information about the photographed image may include at least one of an orientation, resolution, an aspect ratio, and a size of the user image. Also, the information about the combined image may include at least one of a user orientation of each of the plurality of user images, frame coordinates, rotation information, scale information, an aspect ratio, and a number of combined user images.

A plurality of image processing apparatuses 100 of a receiver 1030 receive the information about the combined image 1021 from the MCU 1020 along with the combined image, and processes the combined image based on the information about the combined image 1021 so that the user images in the combined image have the same orientation.

Figure 11:
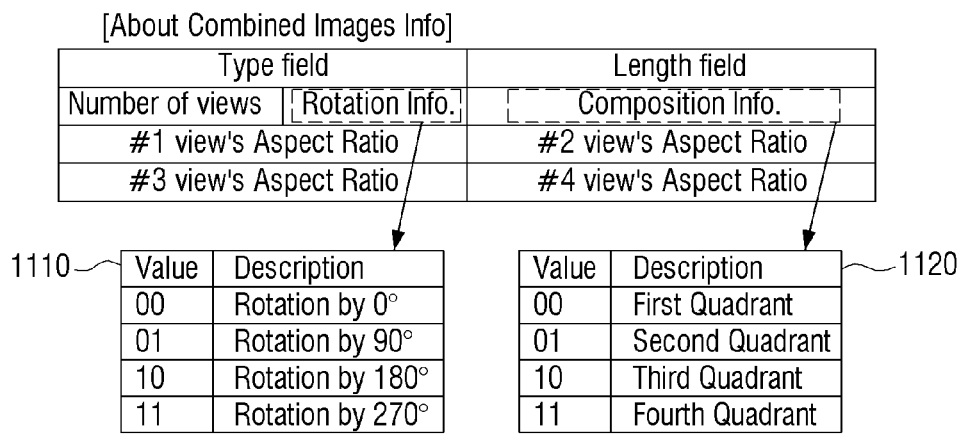
FIG. 11 is a view illustrating a structure of information about a combined image according to an exemplary embodiment.

FIG. 11 is a view illustrating a structure of information about a combined image according to an exemplary embodiment.

Referring to FIG. 11, the information is about a combined image in which four images are combined, and may include a number of images (views), orientation (rotation) information, composition information, and an aspect ratio of images.

Specifically, in an exemplary embodiment, the orientation (rotation) information 1110 consists of 8 bits and 2 of these bits indicate orientation (rotation) information of each image. In an exemplary embodiment, the composition information 1120 consists of 8 bits and 2 of these bits indicate a location of each image. In an exemplary embodiment, the aspect ratio consists of 16 bits and is divided into upper 8 bits and lower 8 bits to indicate the ratio of width to height of each image. For example, if the aspect ratio is 16:9, the upper 8 bits have the value of 16 and the lower 8 bits have the value of 9. If the aspect ratio is 4:3, the upper 8 bits have the value of 4 and the lower 8 bits have the value of 3.

The above-described structure of the image of the combined image may be allocated more bits to expand a range of expression.

Figure 12:
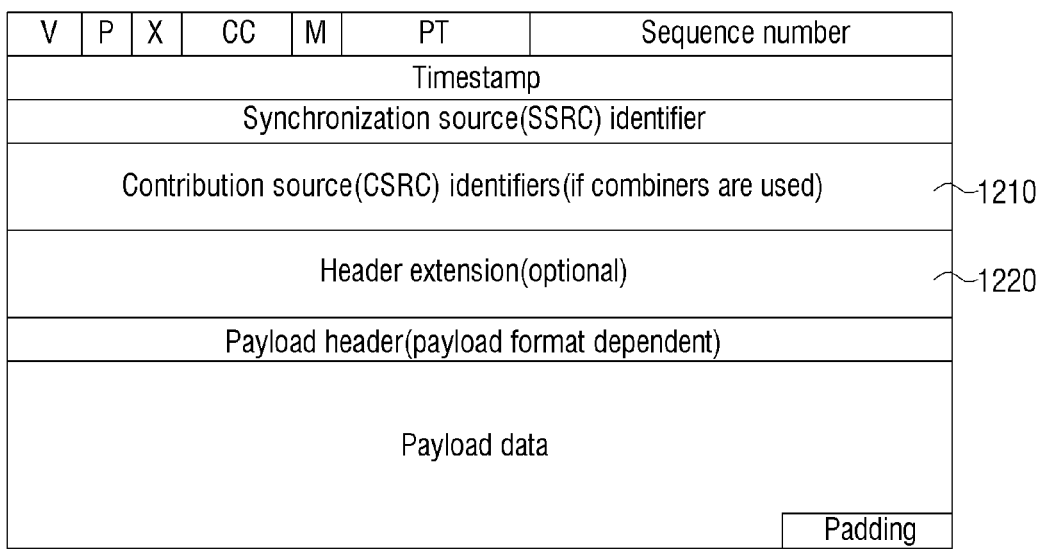
FIG. 12 is a view illustrating a structure of a real-time transport protocol (RTP) header to transmit information about a combined image according to an exemplary embodiment.

FIG. 12 is a view illustrating a structure of a real-time transport protocol (RTP) header to transmit information about a combined image according to an exemplary embodiment.

The communication interface 210 of the image relaying apparatus 200 may transmit a combined image and information about the combined image to the image processing apparatus 100. In this case, the information on the combined image may be transmitted through various channels. FIG. 12 illustrates a method that uses real-time transport protocol (RTP) extension. Also, a service discovery protocol (SDP) may be used. However, if the RTP extension is used, it is easy to synchronize with a combined image transmitted through the RTP.

FIG. 12 illustrates a structure of the RTP header according to an exemplary embodiment. If X bit following a contribution source (CSRC) 1210 is set to 1, a header extension 1220 is attached. The information on the combined image is transmitted using the header extension 1220.

Figure 13:
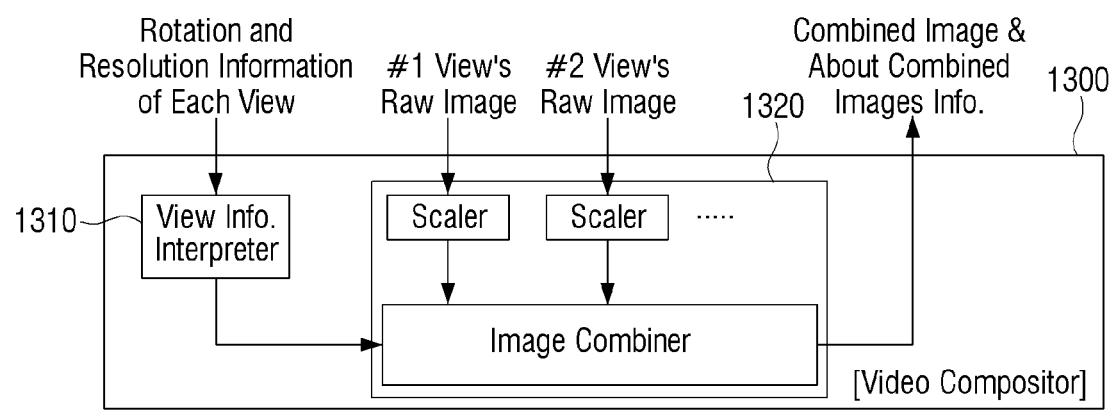
FIG. 13 is a view illustrating an image relaying apparatus according to an exemplary embodiment.

FIG. 13 is a view illustrating an image relaying apparatus according to an exemplary embodiment.

Referring to FIG. 13, in an image relaying apparatus 1300, a view information (info.) interpreter 1310 which receives information (rotation/resolution information) of a photographed image performs a function analogous to the function of the determiner 220, explained above, determining an orientation of the photographed image. Scalers and image combiner 1320 to receive a plurality of images and scale and combine the image performing a function analogous to the function performed by the image processor 230.

Figure 14:
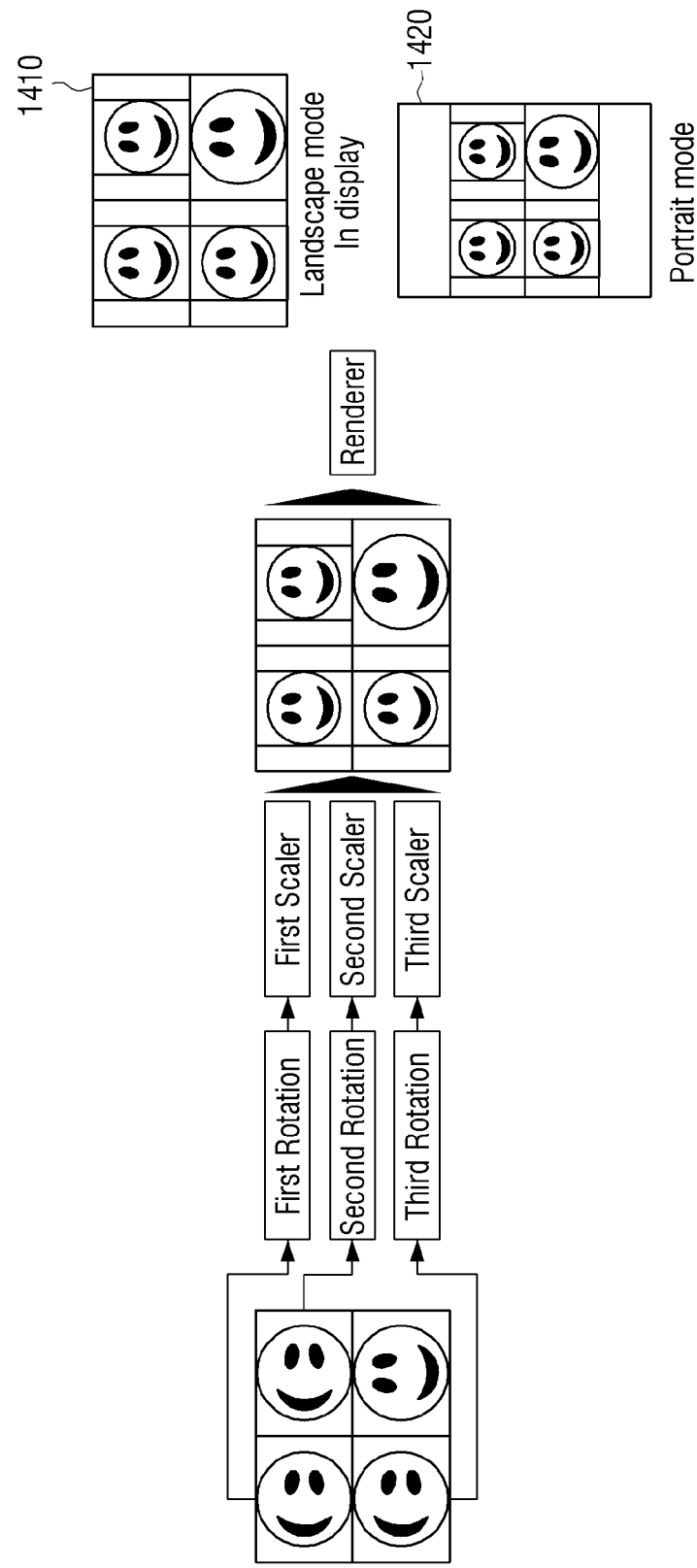
FIGS. 14 and 15 are views illustrating a method of rendering an image according to an exemplary embodiment.
Figure 15:
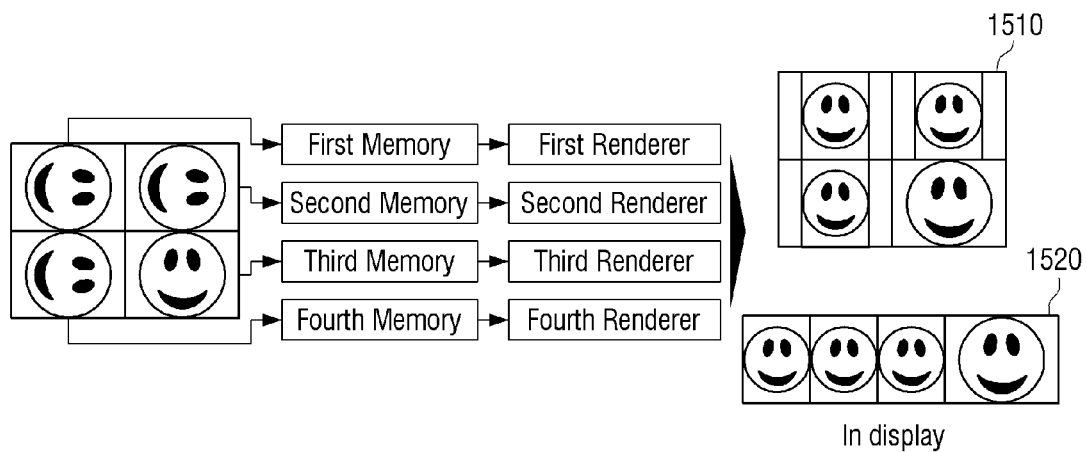

FIGS. 14 and 15 are views illustrating a method of rendering an image according to an exemplary embodiment.

Referring to FIG. 14, the method of rendering the image, which uses only one renderer in the image processing apparatus 100 of the receiver, performs image-processing such as rotation and scaling using a combined image and information about the combined image received from the image relaying apparatus 200, so that users' images in the combined image have the same orientation. The image-processed combined image may be displayed in any one of a landscape mode 1410 and a portrait mode 1420 using only one renderer according to an orientation state of a display panel.

Referring to FIG. 15, the method of rendering the image, which uses a plurality of renderers in the image processing apparatus 100 of the receiver, extracts each user image from a combined image using the combined image and information about the combined image received from the image relaying apparatus 200 (memory copy) and image-processes the user images, and renders the user image which has been extracted and image-processed. In this case, the image may be displayed in any one of a landscape mode 1510 and a portrait mode 1520 according to an orientation state of the display panel like in the case of FIG. 14, and also, the combined image may be displayed in a frame (or layout) 1520 of a free composition regardless of the orientation state of the display panel.

If the multi-renderer is used as shown in FIG. 15, loss of resolution of each user image can be prevented. Also, the degree of freedom increases from the aspect of the UI and thus a limited display space can be effectively used.

FIGS. 16 and 17 are views illustrating a method of processing an image and a method of relaying an image according an exemplary embodiment.

Specifically, FIGS. 16 and 17 illustrate an operation of image-processing a plurality of user images to have the same orientation and combining the images in the image relaying apparatus 200 (rotation in MCU).

Referring to FIG. 16, a MCU 1620, which is an image relaying apparatus 200, is set to combine images in a portrait mode. An image processing apparatus 100 of a sender 1610 transmits a photographed user image and information about the photographed image 1611 to the MCU 1620 which is the image relaying apparatus 200. The MCU 1620 image-processes the plurality of user images using the information about the photographed images 1611 to have the portrait mode, and combines the user images, and transmits a combined image to an image processing apparatus 100 of a receiver 1630. The image processing apparatus 100 of the receiver 1630 may display the combined image according to an orientation state of a display panel.

Figure 17B:
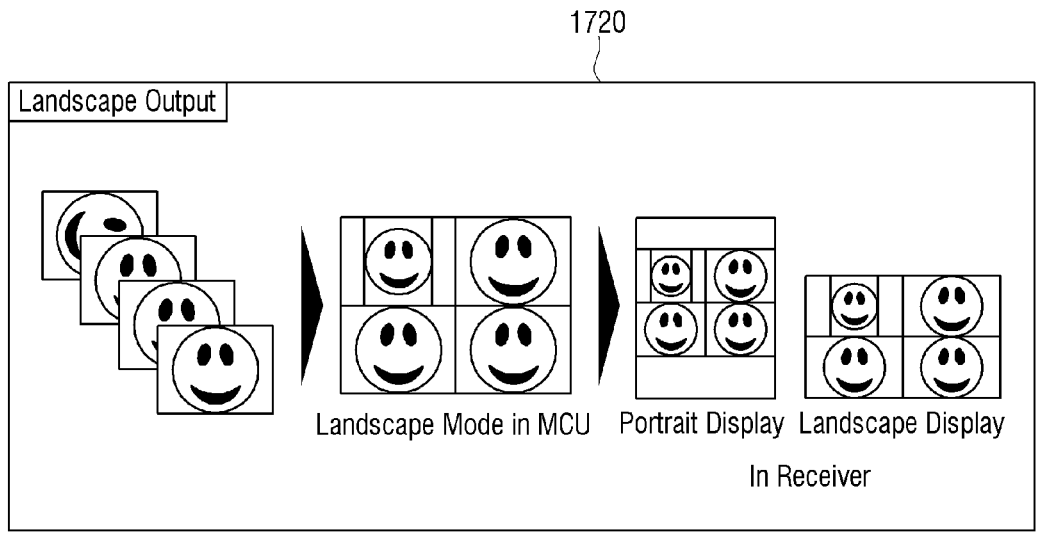

FIGS. 17A and 17B illustrate a method of selecting a combination mode during the operation of image-processing the plurality of user images to have the same orientation and combining the images in the image relaying apparatus 200 (rotation in MCU).

Referring to FIGS. 17A and 17B, the plurality of user images may be combined according to the mode in which more user images are set than in the other mode based on a ratio of images in one mode to images in the other mode.

If the number of user images in the portrait mode is greater than that of the landscape mode, the image relaying apparatus 200 may combine the plurality of user images according to the portrait mode (1710), FIG. 17A.

If the number of user images in the landscape mode is greater than that of the portrait mode, the image relaying apparatus 200 may combine the plurality of user images according to the landscape mode (1720), FIG. 17B.

FIG. 18 is a flowchart illustrating an image relaying operation of an image relaying apparatus 200 according to an exemplary embodiment.

Referring to FIG. 18, the image relaying apparatus 200 receives images photographed by a plurality of image processing apparatuses 100 (in operation S1810), and determines an orientation mode of each of the plurality of images (in operation S1820). Specifically, the image relaying apparatus 200 receives an image photographed by each of the image processing apparatuses 100 along with information about the photographed image, and determines an orientation of each of the plurality of user images using the information about the photographed image received from each of the plurality of image processing apparatuses 100.

If the plurality of images received are user images, the image relaying apparatus 200 may determine the orientation mode of each of the plurality of user images using a face recognition algorithm.

The image relaying apparatus 200 combines the plurality of images (in operation S1830) and transmits a combined image to each of the plurality of image processing apparatuses (in operation S1840). Specifically, the image relaying apparatus 200 may combine the plurality of user images to have the same orientation mode based on the determined orientation.

The image relaying apparatus 200 may transmit information on the combined image to each of the plurality of image processing apparatuses 100 along with the combined mage. In this case, the information on the combined image may include at least one of the determined user orientation of each of the plurality of user images, frame coordinates, rotation information, scale information, an aspect ratio, and a number of user images that are being combined.

The exemplary image relaying method of FIG. 18 may be executed in the image relaying apparatus 200 having the configuration of FIG. 4, or may be executed in image relaying apparatuses of other configurations.

FIG. 19 is a flowchart illustrating an image processing operation of an image processing apparatus 100 according to an exemplary embodiment.

Referring to FIG. 19, the image processing apparatus 100 photographs an image (in operation S1910) and image-processes the photographed image to have a pre-set orientation mode (in operation S1920).

The pre-set orientation mode is an orientation mode that is set to make the photographed image and an image of at least one other image processing apparatus 100 consistent with each other.

The image-processing recited herein refers to performing image-processing such as rotation, scaling, and cropping with respect to the image to have the pre-set orientation mode.

The image processing apparatus 100 transmits the image-processed image to the image relaying apparatus 200 (in operation S1930). Specifically, the image processing apparatus 100 transmits the image which is image-processed to have the pre-set orientation mode to the image relaying apparatus 200.

The image processing apparatus 100 receives a combined image in which the image-processed image and at least one other image are combined (in operation S1940), and displays the combined image (in operation S1950).

The exemplary image processing method of FIG. 19 may be executed in the image processing apparatus 100 having the configuration of FIG. 2, or may be executed in image processing apparatus of other configurations.

FIG. 20 is a flowchart illustrating an image processing operation of an image processing apparatus 100 according to an exemplary embodiment.

Referring to FIG. 20, the image processing apparatus 100 photographs an image (in operation S2010) and transmits the photographed image (in operation S2020).

The image processing apparatus 100 receives a combined image in which the photographed image and at least one other image photographed by at least one other image processing apparatus 100 are combined from the image relaying apparatus 200 (in operation S2030), and image-processes the photographed image and the at least one other image in the combined image to have a pre-set orientation mode (in operation S2040). Specifically, the image processing apparatus 200 may receive the combined image and information about the combined image.

In this case, the image processing apparatus 100 may image-process the photographed image and the at least one other image in the combined image to have the pre-set orientation mode using the information on the combined image. The image-processing may be a combination of rotation, scaling, or cropping.

If the photographed image and the at least one other image are user images, the image processing apparatus 100 may image-process the photographed image and the at least one other image in the combined image to have the pre-set orientation mode using a face recognition algorithm.

The image processing apparatus 100 displays the image-processed combined image (in operation S2050).

The exemplary image processing method of FIG. 20 may be executed in the image processing apparatus 100 having the configuration of FIG. 2, or may be executed in image processing apparatuses of other configurations.

FIG. 21 is a flowchart illustrating an image processing operation of an image processing apparatus 100 according to an exemplary embodiment.

Referring to FIG. 21, the image processing apparatus 100 photographs an image (in operation S2110), and transmits the photographed image (in operation S2120).

The image processing apparatus 100 receives a combined image in which the photographed image and at least one other image photographed by at least one other image processing apparatus 100 are combined from the image relaying apparatus 200 (in operation S2130), and extracts the photographed image and the at least one other image from the combined image, and renders the images into an image having a pre-set layout (in operation S2140). Specifically, the image processing apparatus 100 may receive information on the combined image along with the combined image.

In this case, the image processing apparatus 100 extracts the photographed image and the at least one other image from the combined image using the information about the combined image. The image processing apparatus 100 renders the extracted images using a plurality of renderers to have the pre-set layout (or frame).

The rendered image is displayed (in operation S2150).

The exemplary image processing method of FIG. 21 may be executed in the image processing apparatus 100 having the configuration of FIG. 2, or may be executed in image processing apparatuses of other configurations.

As described above, according to the exemplary embodiments, the image processing apparatus, the image relaying apparatus, the image processing method and the image relaying method, which can provide an appropriate combined image, can be provided.

The methods according to the above-described exemplary embodiments may be programmed and stored in various storage media. Accordingly, the methods according to the above-described various exemplary embodiments can be realized in various kinds of electronic apparatuses which execute the storage media.

Specifically, a non-transitory computer readable medium, which stores a program for performing operations including: receiving images photographed by a plurality of image processing apparatuses, determining an orientation mode of each of the received plurality of images, combining the plurality of images, and transmitting the combined image to the plurality of image processing apparatuses, in sequence, may be provided.

The non-transitory computer readable medium is a medium that stores data semi-permanently rather than storing data for a very short time such as a register, a cache, and a memory, and is readable by an apparatus. Specifically, the above-described applications or programs may be stored in the non-transitory computer readable medium such as a CD, a DVD, a hard disk, a blue-ray disk, a USB, a memory card, and a ROM, and may be provided.

The foregoing exemplary embodiments are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art. The scope is defined not by the detailed description of exemplary embodiments but by the appended claims, and their equivalents and all differences within the scope will be construed as being included in an inventive concept.

What is claimed is:

1. A method of relaying an image comprising:
   receiving a plurality of images from a plurality of image processing apparatuses;
   determining orientation modes of each of the plurality of images, wherein the orientation mode of said each of the plurality of images is determined according to an orientation state of a display panel contained in a respective image processing apparatus from among the plurality of image processing apparatuses;
   combining the plurality of images to generate a combined image, the combined image being an image in which the plurality of images are adjusted and aligned to be in the same orientation mode; and
   transmitting the combined image together with information about the combined image which comprises a number of images that were combined to the plurality of image processing apparatuses,
   wherein the information about the combined image further comprises the determined orientation mode of each of the plurality of images.

2. The method as claimed in claim 1, wherein the combining comprises combining the plurality of images to have the same orientation mode based on the determined orientation modes.

3. The method as claimed in claim 1, wherein the receiving comprises receiving, from the plurality of image processing apparatuses, information about the images that were photographed by the plurality of image processing apparatus along with the images,
   wherein the determining comprises determining the orientation modes of the plurality of images using the information about the images received from the plurality of image processing apparatuses.

4. The method as claimed in claim 1, wherein the determining comprises, if the plurality of images received are user images, determining the orientation modes of the plurality of user images is further performed using a face recognition algorithm.

5. The method of claim 4, wherein an angle of rotation for each of the plurality of user images is determined by applying the face recognition algorithm comprising at least one of a geometrical method, principal component analysis, fisher linear discriminant, a support vector machine, and a neural network circuit.

6. The method of claim 1, wherein the information about the combined image further comprises rotation angle for each of the plurality of images being combined.

7. A method of processing an image comprising:
   capturing an image by an image processing apparatus;
   transmitting the captured image to an image relaying apparatus;
   receiving information together with a combined image in which the captured image and at least one other image of at least one other image processing apparatus are combined using the image relaying apparatus;
   extracting the captured image and the at least one other image from the combined image based on the information to change the orientation of the extracted images in the combined image, and rendering the extracted images into an image having a pre-set layout; and displaying the rendered image, wherein the information about the combined image comprises a number of images being combined and an orientation mode of each of the images.

8. The method of claim 7, wherein the information about the combined image further comprises individual resolution and individual size of each of the images, which are still images captured by a plurality of users and wherein the resolution of at least two of the plurality of images is different and wherein the size of at least two of the images is different.

9. The method of claim 7, further comprising: determining at least one of the number of images to be combined in a portrait mode and the number of images to be combined in a landscape mode; setting an orientation mode for the combined image based on the determining of whether the number of images in the portrait mode is greater than the number of images in the landscape mode.

10. The method of claim 9, in response to the determining yielding that the number of images to be combined in the portrait mode is greater than the number of images to be combined in the landscape mode, setting the orientation mode to portrait mode for the combining.

11. The method of claim 7, wherein the captured image and the at least one other image are photographed images.

12. An image processing apparatus comprising:

a camera which photographs an image;

a communication interface which transmits the photographed image and which receives information comprising determined orientation of each of a plurality of images, rotation information, scale information, and an aspect ratio, together with a combined image in which the photographed image and at least one other image of at least one other image processing apparatus from among the plurality of images, are combined;

an image processor which image-processes the combined image so that the photographed image and the at least one other image in the combined image have a pre-set orientation mode; and a user interface which displays the image-processed combined image.

13. The image processing apparatus as claimed in claim 12, wherein the image processor image-processes the combined image using the information about the combined image so that the photographed image and the at least one other image in the combined image have the pre-set orientation mode.

14. The image processing apparatus as claimed in claim 12, wherein, if the photographed image and the at least one other image are user images, the image processor image-processes the combined image using a face recognition algorithm so that the photographed image and the at least one other image in the combined image have the pre-set orientation mode.

15. An image processing apparatus comprising:

a camera which photographs an image;

a communication interface which transmits the photographed image, and receives information together with a combined image in which the photographed image and at least one other image of at least one other image processing apparatus are combined; and an image processor which extracts the photographed image and the at least one other image from the combined image based on the information to change the orientation of the extracted images in the combined image, and renders the extracted images into an image having a pre-set layout; and a user interface which displays the rendered image, wherein the information about the combined image comprises a number of images being combined and an orientation mode of each of the images.

16. A non-transitory computer readable recording medium which comprises a program for executing by a computer a method of relaying an image of an image relaying apparatus, the method comprising:

receiving a plurality of images which are captured by a plurality of image processing apparatuses;

determining orientation modes of each of the plurality of images, the orientation mode of each of the plurality of images being determined according to an orientation state of a display panel contained in a respective image processing apparatus from among the plurality of image processing apparatuses;

combining the plurality of images to generate a combined image, wherein the combined image is an image in which the plurality of images are adjusted and aligned to be in the same orientation mode; and transmitting information together with the combined image to the plurality of image processing apparatuses, wherein the information about the combined image comprises a number of images being combined, and wherein the information about the combined image further comprises the determined orientation mode of each of the plurality of images.

17. A non-transitory computer readable recording medium which comprises a program for executing by a computer a method of processing an image of an image processing apparatus, the method comprising:

capturing an image;

transmitting the captured image to an image relaying apparatus;

receiving information together with a combined image in which the captured image and at least one other image of at least one other image processing apparatus are combined using the image relaying apparatus;

image-processing the combined image so that the photographed image and the at least one other image in the combined image have a pre-set orientation mode; and displaying the image-processed combined image, wherein the information about the combined image comprises a number of images being combined, determined orientation mode of each of the plurality of images, frame coordinates, rotation information, scale information, and an aspect ratio.

18. A non-transitory computer readable recording medium which comprises a program for executing by a computer a method of processing an image of an image processing apparatus, the method comprising:

capturing an image;

transmitting the captured image to an image relaying apparatus;

receiving information together with a combined image in which the captured image and at least one other image of at least one other image processing apparatus are combined using the image relaying apparatus;

extracting the captured image and the at least one other image from the combined image based on the information to change the orientation of the extracted images in the combined image, and rendering the extracted images into an image having a pre-set layout; and displaying the rendered image, wherein the information about the combined image comprises a number of images being combined and an orientation mode of each of the images.

19. A method of relaying an image comprising:

receiving a plurality of images from a plurality of image processing apparatuses;

determining orientation modes of each of the plurality of images;

combining the plurality of images to generate a combined image; and transmitting the combined image together with information about the combined image which comprises a number of images that were combined to the plurality of image processing apparatuses, wherein the information about the combined image comprises the determined orientation mode of each of the plurality of images, frame coordinates, rotation information, scale information, and an aspect ratio.

* * * * *